(12) United States Patent
Starkey et al.

(10) Patent No.: US 7,980,972 B1
(45) Date of Patent: Jul. 19, 2011

(54) ROLLER VARIATOR FOR ACTUATING CONTINUOUSLY VARIABLE TRANSMISSIONS

(75) Inventors: John M. Starkey, West Lafayette, IN (US); Enrico N. Manes, West Lafayette, IN (US); Benjamin J. Rumley, Fakenham (GB)

(73) Assignee: Purdue Research Foundation, West Lafayette, IN (US)

( * ) Notice: Subject to any disclaimer, the term of this patent is extended or adjusted under 35 U.S.C. 154(b) by 631 days.

(21) Appl. No.: 11/952,996

(22) Filed: Dec. 7, 2007

Related U.S. Application Data

(63) Continuation-in-part of application No. 11/415,391, filed on May 1, 2006, now Pat. No. 7,771,300.

(60) Provisional application No. 60/873,446, filed on Dec. 7, 2006.

(51) Int. Cl.
*F16H 55/56* (2006.01)

(52) U.S. Cl. .............................................. 474/8; 474/39

(58) Field of Classification Search ................ 474/8, 18, 474/20, 17, 273, 39
See application file for complete search history.

(56) References Cited

U.S. PATENT DOCUMENTS

| | | |
|---|---|---|
| 197,472 A | 11/1877 | Hunt |
| 2,184,395 A | 12/1939 | Morse |
| 2,400,294 A | 5/1946 | Firth et al. |
| 2,532,124 A | 11/1950 | Shaw |
| 2,611,277 A | 9/1952 | Mitchell |
| 2,754,691 A | 7/1956 | May |
| 2,884,810 A | 5/1959 | Chapman |
| 3,491,609 A | 1/1970 | Henriksen |
| 3,571,884 A | 3/1971 | Chung |

(Continued)

FOREIGN PATENT DOCUMENTS

DE 198 51 738 A1 5/2000

(Continued)

OTHER PUBLICATIONS

F. W. Heilich et al., *Traction Drives: Selection and Application*, Marcel Dekker, Inc., ©1983, pp. 6-7, 12-13, 16-17, 20-27, 30-49, 52-53, 56-61, 66-69, 74-75, 108-109.

(Continued)

*Primary Examiner* — Michael R Mansen
*Assistant Examiner* — Juan J Campos
(74) *Attorney, Agent, or Firm* — William F. Bahret (57) ABSTRACT

A continuously variable transmission (CVT) with a roller variator as an actuator for adjusting the speed ratio of the CVT. The CVT is of the variable-diameter pulley type and has first and second variable-diameter pulleys mechanically linked by a drive belt or other flexible drive member, the pulleys each having first and second relatively axially movable pulley portions. A roller variator is operatively connected to the first pulley, preferably the drive pulley, for control of its effective diameter. The roller variator has first and second disks mounted on the axis of the first pulley, a roller interconnecting the disks, and a roller support adapted to tilt the spin axis of the roller so as to change its points of contact with the disks and thereby change the speed ratio of the variator. The first disk is rotatably fixed with respect to the first pulley portion of the first pulley, for example, the pulley portion fixed to an engine shaft. In certain embodiments, the second disk directly drives the second pulley portion relative to the first, and, in other embodiments, the second disk drives the second pulley portion through a threaded connection, for example, one having directly engaging male and female threaded parts, or a ball screw.

11 Claims, 6 Drawing Sheets

U.S. PATENT DOCUMENTS

| | | | |
|---|---|---|---|
| 3,776,053 A | 12/1973 | Segerstad | |
| 4,541,821 A | 9/1985 | Sakakibara | |
| 4,573,566 A | 3/1986 | Roman | |
| 4,601,680 A | 7/1986 | Tokoro | |
| 4,614,128 A | 9/1986 | Fickler | |
| 4,703,666 A | 11/1987 | Fickler | |
| 4,715,241 A | 12/1987 | Lipinski et al. | |
| 4,811,225 A | 3/1989 | Petzold et al. | |
| 4,838,834 A | 6/1989 | Miyata | |
| 4,926,709 A | 5/1990 | Gardner | |
| 4,964,841 A * | 10/1990 | Takayama et al. | 474/11 |
| 5,069,081 A | 12/1991 | Morita | |
| 5,094,118 A | 3/1992 | Morita | |
| 5,488,880 A | 2/1996 | Sartorio | |
| 5,527,225 A | 6/1996 | Dick | |
| 5,662,538 A | 9/1997 | Wang | |
| 5,860,888 A | 1/1999 | Lee | |
| 5,984,829 A * | 11/1999 | Minagawa et al. | 477/98 |
| 6,077,187 A | 6/2000 | Suzuki et al. | |
| 6,186,915 B1 | 2/2001 | Dietl | |
| 6,219,608 B1 | 4/2001 | Abo et al. | |
| 6,243,638 B1 | 6/2001 | Abo et al. | |
| 6,626,778 B1 * | 9/2003 | Kapaan et al. | 474/20 |
| 6,689,000 B1 * | 2/2004 | Kapaan et al. | 474/20 |
| 6,743,129 B1 | 6/2004 | Younggren et al. | |
| 6,811,504 B2 | 11/2004 | Korenjak et al. | |
| 6,908,405 B2 | 6/2005 | Otaki et al. | |
| 7,163,477 B1 | 1/2007 | Sherrod | |
| 2002/0123400 A1 | 9/2002 | Younggren et al. | |
| 2004/0116218 A1 | 6/2004 | Butsch et al. | |
| 2005/0037876 A1 | 2/2005 | Unno et al. | |
| 2005/0090367 A1 | 4/2005 | Jonsson et al. | |
| 2005/0096822 A1 | 5/2005 | Aoki | |
| 2005/0255957 A1 | 11/2005 | Miller et al. | |
| 2005/0272540 A1 * | 12/2005 | Starkey | 474/39 |
| 2006/0264279 A1 * | 11/2006 | Starkey et al. | 474/18 |
| 2009/0197717 A1 * | 8/2009 | Kremer et al. | 474/18 |

FOREIGN PATENT DOCUMENTS

| | | |
|---|---|---|
| EP | 0 319 035 A1 | 6/1989 |
| EP | 0 701 073 B1 | 10/2000 |
| EP | 1 099 885 A2 | 5/2001 |
| EP | 0 931 228 B1 | 10/2002 |
| JP | S60-164054 | 2/1987 |
| JP | 62-159847 A | 7/1987 |
| WO | WO00/49313 | 8/2000 |
| WO | WO00/60256 | 10/2000 |
| WO | WO02/50453 A1 | 6/2002 |

OTHER PUBLICATIONS

J. Singh et al., "General Motors "VTi" Electronic Continuously Variable Transaxle," *Transmission & Driveline Systems Symposium 2003*, SAE International, © 2003, pp. 99-106.

International Search Report and Written Opinion dated Sep. 25, 2007, in PCT Application No. PCT/US2006/016703 (7 pages).

Supplementary European Search Report with European Search Opinion dated Aug. 31, 2010, in European Application No. 06758880.6.

* cited by examiner

ROLLER VARIATOR FOR ACTUATING CONTINUOUSLY VARIABLE TRANSMISSIONS

CROSS-REFERENCE TO RELATED APPLICATIONS

This application is a continuation-in-part of patent application Ser. No. 11/415,391, filed May 1, 2006, now U.S. Pat. No. 7,771,300, issued Aug. 10, 2010, which is hereby incorporated by reference. This application also claims the benefit of U.S. Provisional Patent Application Ser. No. 60/873,446, filed Dec. 7, 2006, which application is hereby incorporated by reference.

BACKGROUND OF THE INVENTION

This invention relates generally to transmissions, and more particularly to methods and apparatus for actuation of continuously variable transmissions.

Transmissions are devices that transform the speed and torque in vehicles using gears, belts, or other drive components. Most transmission designs use discrete speed ratios: low ratios for acceleration, hill climbing, and heavy hauling, and high ratios for higher-speed travel. They use multiple parallel gear sets between input and output shafts. By changing which gear set carries the loads between the shafts, the speed ratio between the input and output shafts is altered.

Transmissions have also been designed that are continuously variable (CVTs). These generally use friction to transfer load from an input shaft to an output shaft. By altering the radial position of friction rollers, belts, or other components, the speed ratio is changed.

Most current CVTs rely upon fixed-design mechanical or hydraulic actuation that cannot be easily changed to respond to differing demands, such as varying vehicle cargo loads and operator performance demands. Accordingly, there is need for a CVT actuation system that is more flexible and adaptable than the current state of technology.

SUMMARY OF THE INVENTION

Figure 6A:
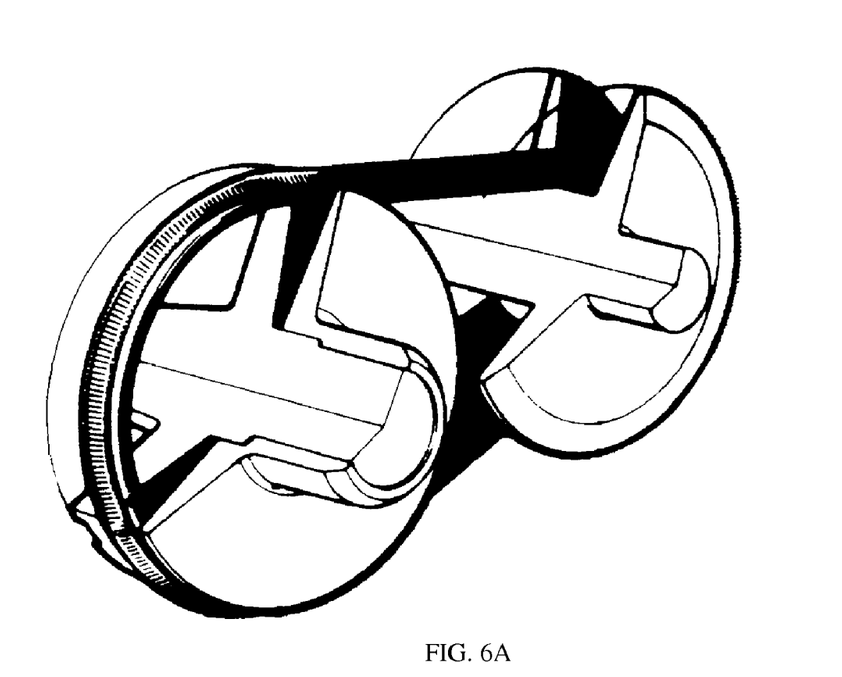
FIG. 6A is a perspective view of first and second variable-diameter pulleys mechanically linked by a flexible drive member, the pulleys each having first and second relatively axially movable pulley portions, with the pulleys set for a first speed ratio.
Figure 6B:
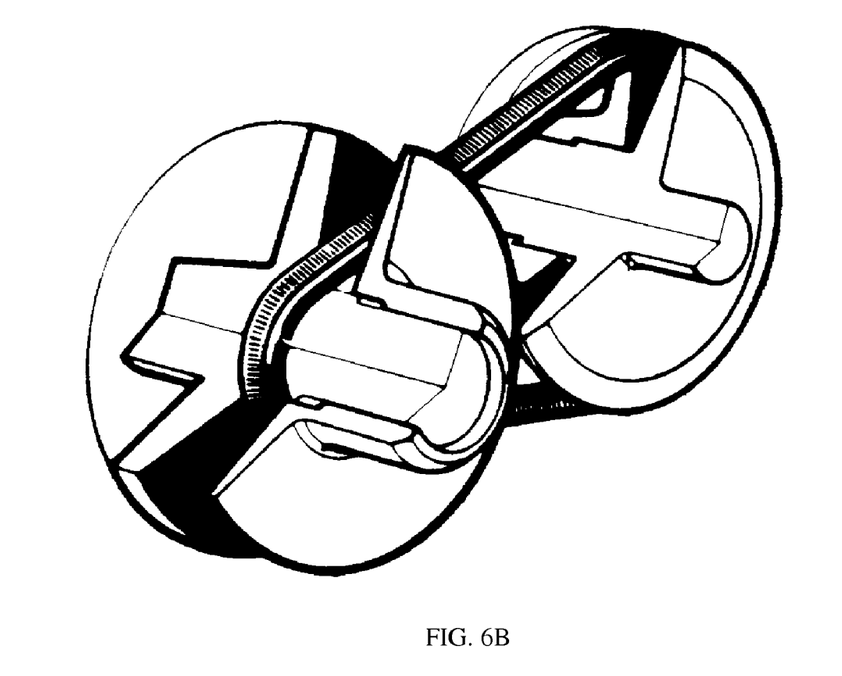
FIG. 6B shows the variable-diameter pulleys of FIG. 6A with the pulleys set for a second speed ratio.

The present invention provides a continuously variable transmission (CVT) with a roller variator as an actuator for adjusting the speed ratio of the CVT. According to one aspect of the invention, the CVT is of the variable-diameter pulley type and has first and second variable-diameter pulleys mechanically linked by a drive belt or other flexible drive member, the pulleys each having first and second relatively axially movable pulley portions as shown in FIGS. 6A and 6B. A roller variator is operatively connected to the first pulley, preferably the drive pulley, for control of its effective diameter. The roller variator has first and second disks mounted on the axis of the first pulley, a roller interconnecting the disks, and a roller support adapted to tilt the spin axis of the roller so as to change its points of contact with the disks and thereby change the speed ratio of the variator. The first and second disks are connected respectively to the first and second relatively axially movable pulley portions of the first pulley.

In certain embodiments, the first and second disks are rotatably fixed with respect to the first and second pulley portions, respectively, and one disk directly drives one axially movable pulley portion relative to the other pulley portion.

In other embodiments, a first disk is rotatably fixed with respect to a first pulley portion, and the other disk drives the other pulley portion through a threaded connection, including but not limited to directly engaging male and female threaded parts, and ball screws.

The objects and advantages of the present invention will be more apparent upon reading the following detailed description in conjunction with the accompanying drawings.

DETAILED DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 1A:
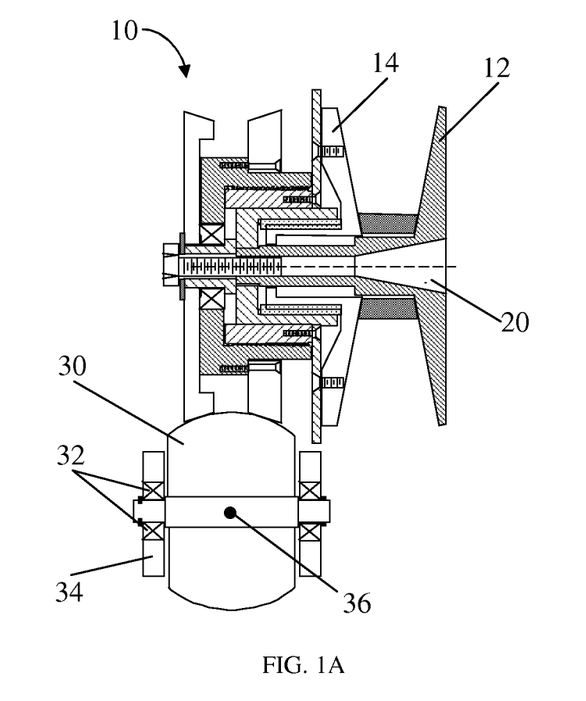
FIG. 1A is a cross-sectional view of an embodiment of a variable actuator in accordance with the present invention, in a lower speed ratio configuration.
Figure 1B:
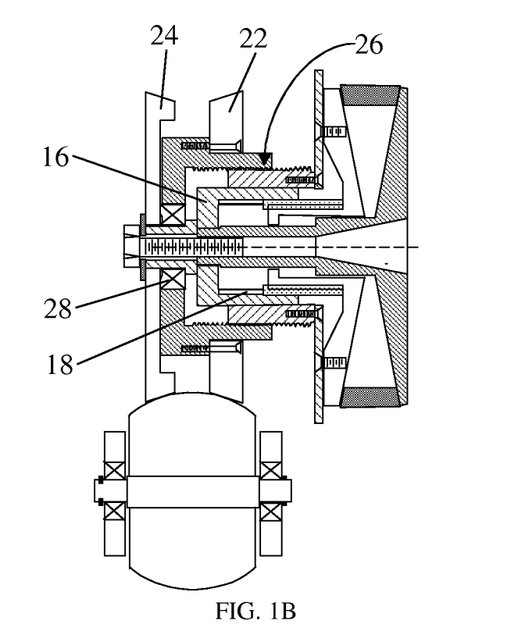
FIG. 1B is a cross-sectional view of the variable actuator of FIG. 1A, shown in a higher speed ratio configuration.

FIGS. 1A and 1B show an embodiment of a variable actuator 10 according to the present invention. Actuator 10 is a roller variator, also known as a roller-based or toroidal CVT, and it is used to control a variable-diameter pulley CVT. One aspect of the present invention is therefore a CVT controlled by another CVT. In the embodiment of FIGS. 1A and 1B, the roller variator is connected to the drive pulley of the variable-diameter pulley CVT. The drive pulley is adapted for mounting on an output shaft of an engine (not shown) or other source of power, and it includes a fixed pulley half 12 next to the engine (or other source of power), and a movable pulley half 14 outboard from the engine. The movable pulley half is concentric with the fixed pulley half and can move axially relative to it. The movable pulley half is also constrained by a cup 16, such that it can move axially, but not rotate, as by spline 18 relative to the fixed pulley half 12. The cup is fixed to the engine shaft 20. The movable pulley half is also coupled to one of two variator disks 22 and 24 by a threaded connection 26 which constrains the relative motion between the movable pulley half and variator disk 22 to be helical, as by the threaded connection shown. This same variator disk, disk 22, is also constrained by a bearing 28 so that its only relative motion with respect to the engine shaft is rotation about the axis of the engine shaft. The second variator disk 24 is fixed to the engine shaft.

Figure 2A:
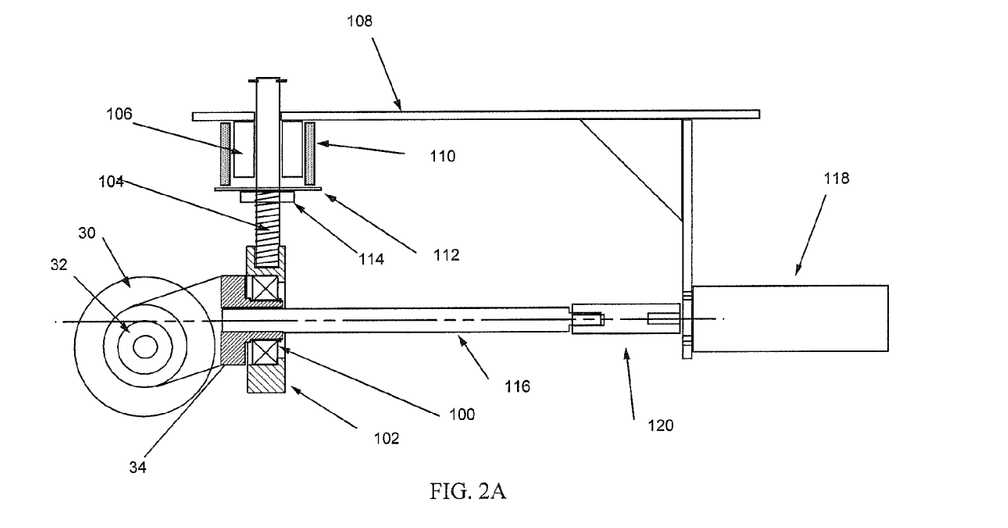
FIG. 2A is a side view of an embodiment of an actuator to control the actuation angle of the roller in accordance with the present invention.
Figure 2B:
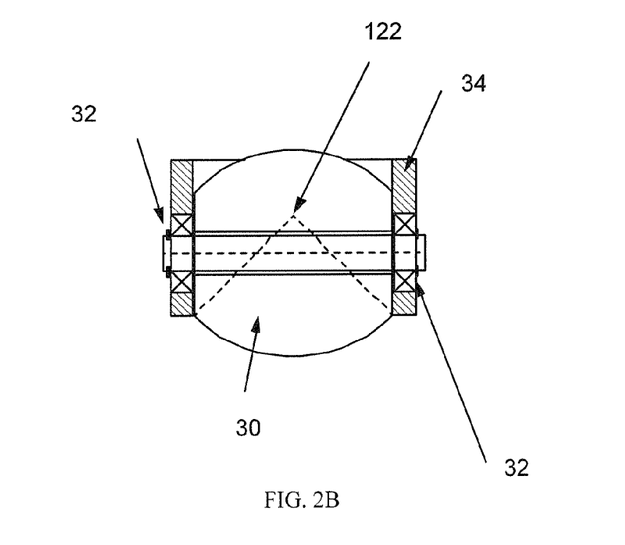
FIG. 2B is an end view of the roller shown in FIG. 2A.

A roller 30, with a substantially barrel-shaped surface, is in friction contact with the two variator disks 22 and 24. The roller is mounted on a shaft as shown in FIGS. 2A and 2B and constrained to spin by bearings 32, mounted in a cradle or yoke 34. The yoke 34 is fitted into bearing 100 which is preferably a rolling element bearing of the type that allows angular misalignment. Bearing 100 is preferably pressed into the actuator bearing ring 102, which is threaded onto a shaft or pin 104. Pin 104 is free to translate within guide bushing 106, which is fixed to the frame of the machine to which the engine shaft of the CVT is constrained by the plate 108. A spring 110 provides preload force between the plate 108 and the shaft 104 by pushing on the washer 112 and jam nut 114. This preloads the roller into contact with the variator disks of the CVT to maintain normal forces between the roller and the disks, to allow friction forces to be transmitted through the roller-disk contact regions for actuation of the CVT. The surface of the roller is preferably shaped so that the axis of shaft 116 intersects the center of curvature at point 122 shown in FIG. 2B, such that the roller's contact surface (the lower surface as viewed in FIG. 2B) remains in frictional engagement with both disks as the roller axis is tilted. One end of actuator shaft 116 is preferably pressed or threaded into the yoke 34 and the other end of the actuator shaft 116 is connected to a gear-motor 118, preferably with a speed-reducing gear train, through a universal joint 120.

Operation of the variable actuator 10 is as follows. When the roller 30 is substantially centered, as shown in FIGS. 1A and 1B, the two variator disks 22 and 24 are urged to spin at the same speed, causing no relative rotation across the threads 26, and therefore no axial motion of the movable pulley half 14. Angular actuation of the roller 30 is accomplished by energizing the coils of the electric gear-motor 118 of FIGS. 2A and 2B. Energization which results in rotation in one direction will cause the roller 30 to rotate one way about the axis of the shaft 116, causing it to contact the variator disks 22 and 24 at differing radial position on roller 30. Rotation of the gear-motor 118 in the opposite direction will rotate the roller 30 in the opposite direction, imparting an opposite sense speed difference to the variator disks. When the roller is inclined or rotated about the roller actuation axis 36 of FIGS. 1A and 1B, which is oriented into the page of the drawing, it urges the two variator disks to spin at different speeds, which causes relative rotation across the threaded connection. This imparts axial motion to the movable pulley half relative to the fixed pulley half 12, which actuates the CVT to change ratio. Because the roller can be actuated in either direction from the centered position shown, the movable pulley half can be moved toward or away from the fixed pulley half. Regulation of the roller actuation angle, as by a suitable electric motor and control system, can control the relative axial position of the pulley halves, and thereby control the CVT ratio. One example of a suitable electric motor and control system is disclosed in U.S. Pat. No. 7,771,300, issued Aug. 10, 2010, which is hereby incorporated by reference along with all references cited therein.

In the embodiment as shown in FIGS. 1A and 1B, pulley half 12 is rotatably fixed or nonrotatable, i.e., not capable of rotating, with respect to the engine shaft, and it is also axially fixed. It will be understood, however, that this is but one example of a pulley with relatively axially movable pulley portions, and that both pulley halves may be axially movable or floating to some degree while still having their relative axial spacing controlled by an actuator in accordance with the present invention. It should also be understood that, in some applications, it may be suitable to have an actuator according to the present invention alternatively mounted on the CVT's driven pulley, i.e., the pulley driven by the illustrated pulley via a drive belt or other flexible drive member. It should also be understood that, in accordance with the present invention, the movable pulley half could be on the inboard or engine side of the CVT driver pulley and the fixed pulley half could be on the outboard side.

Advantages of this embodiment include:
(1) The power requirements for moving the pulley halves 12 and 14 apart and together come primarily from the engine shaft, through the second variator disk 24. This greatly reduces the actuator power requirements for the system.
(2) The spline coupling 18 between the pulley halves decouples the belt forces from the actuation of the pulley halves.

Figure 3A:
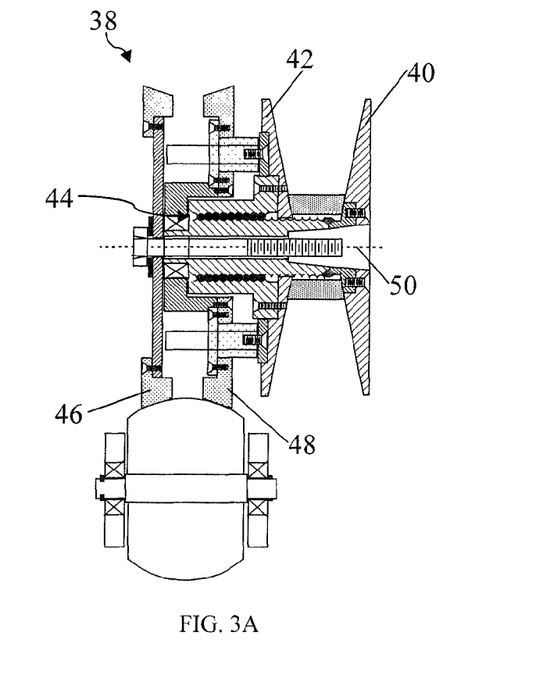
FIG. 3A is a cross-sectional view of another embodiment of a variable actuator in accordance with the present invention, in a lower speed ratio configuration.
Figure 3B:
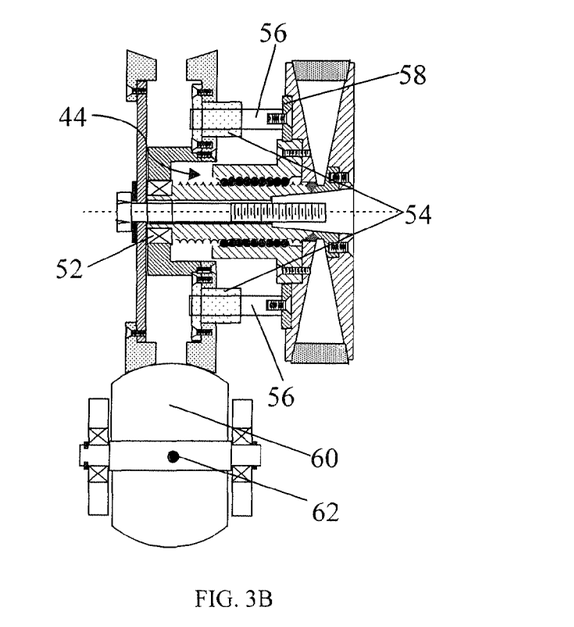
FIG. 3B is a cross-sectional view of the variable actuator of FIG. 3A, shown in a higher speed ratio configuration.

FIGS. 3A and 3B show another embodiment of a variable actuator 38 according to the present invention. This embodiment also shows a fixed pulley half 40 next to an engine (or other source of power), and the movable pulley half 42 outboard from the engine (not shown). In this embodiment, the movable pulley half is constrained to the fixed pulley half by a helical connection 44, as by threads, or the ball screw shown in FIGS. 2A and 2B. Two variator disks 46 and 48 are also used, one, 46, fixed to the engine shaft 50 as shown, and the second, 48, constrained to rotate about the engine shaft by the bearing 52 as shown. The second variator disk is fixed to at least two linear bearings 54, which allow axial relative motion of pins 56 which are connected to the movable pulley half by the base plate 58. A roller 60 is in friction contact with the two variator disks, and can actuate them as previously disclosed above.

Operation of this variable actuator embodiment is as follows. When the roller 60 is substantially centered, as shown, the two variator disks 46 and 48 are urged to spin at the same speed, causing no relative rotation across the ball screw 44, and therefore no axial motion of the movable pulley half 42. When the roller is inclined or rotated about the roller actuation axis 62 (into the page of the drawing), it urges the two variator disks to spin at different speeds, which causes the linear bearings 54 to push the pins 56 rotationally, i.e., to transfer a rotational force from disk 48 to pins 56, thereby rotating the movable pulley half on the ball screw relative to the fixed pulley half 40. That is, the linear bearing and the pins within them rotate with disk 48, as does the movable pulley half. Because of the constraint of the ball screw, relative rotation of the pulley halves also causes relative axial motion, which actuates the CVT. Because the roller can be actuated in either direction from the centered position shown, the movable pulley half can be moved toward or away from the fixed pulley half. Regulation of the roller actuation angle, as by the above-referenced electric motor and control system, can control the relative axial position of the pulley halves, and thereby control the CVT ratio.

Advantages of this embodiment include:
(1) The power requirements for moving the pulley halves 40 and 42 apart and together come primarily from the engine shaft 50, through the first variator disk 46. This greatly reduces the actuator power requirements for the system.
(2) Belt tension (resulting from engine drive torque) tends to actuate the pulley halves because of the helical motion constraint of the ball screw 44. The lead of the screw (angle and hand) can be tuned to optimize this effect.
(3) Rolling elements are used to reduce friction at three key places in the CVT: in the ball screw, in the linear bearings 54, and in the bearing 52 connecting the second variator disk 48 to the engine shaft.

It should be understood by one of ordinary skill in the art that the linear bearings 54, which contain rolling elements, could be replaced with bushings, and the ball screw 44 could be replaced with a threaded joint containing no rolling elements. It should also be understood that an actuator of the type shown in FIGS. 2A and 2B could also be used to control the angular orientation of the roller in the embodiment shown in FIGS. 3A and 3B.

Figure 4A:
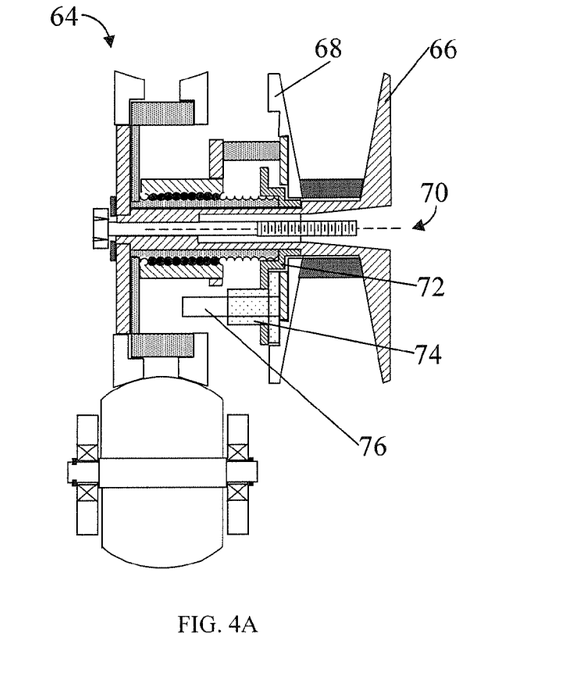
FIG. 4A is a cross-sectional view of yet another embodiment of a variable actuator in accordance with the present invention, in a lower speed ratio configuration.
Figure 4B:
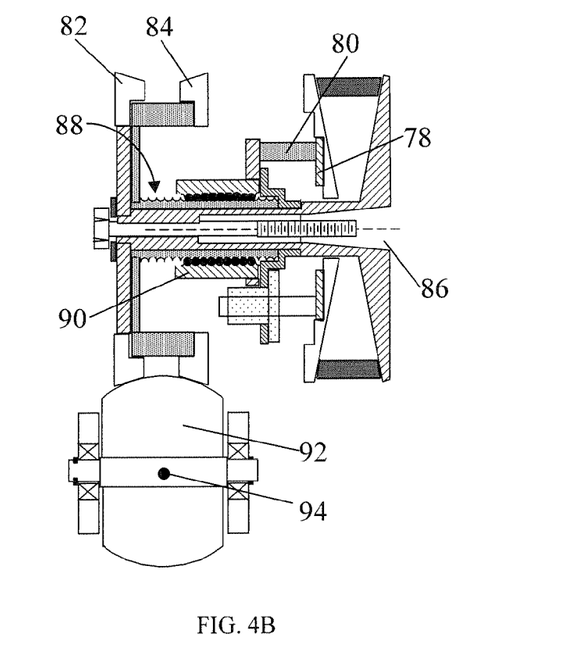
FIG. 4B is a cross-sectional view of the variable actuator of FIG. 4A, shown in a higher speed ratio configuration.
Figure 5A:
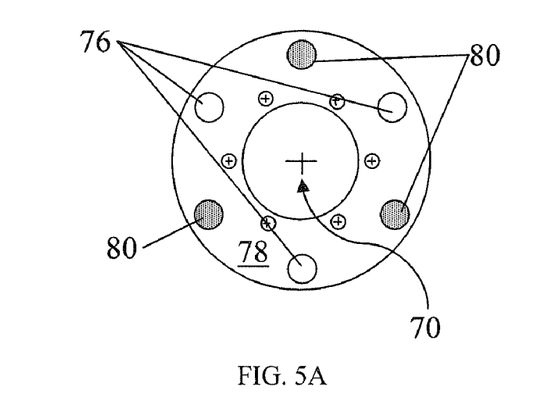
FIG. 5A is a side view of the base plate of the variable actuator of FIGS. 4A and 4B.
Figure 5B:
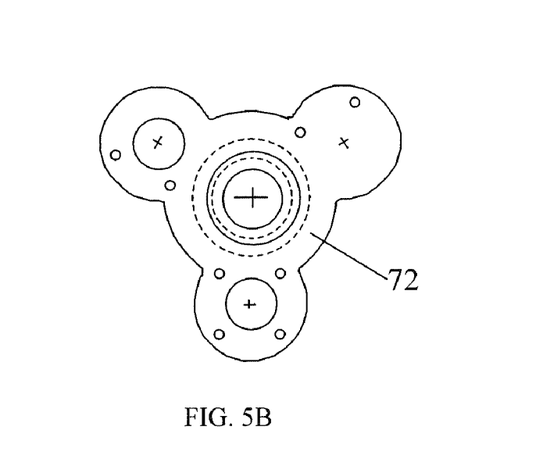
FIG. 5B is a side view of the linear bearing plate of the variable actuator of FIGS. 4A and 4B.
Figure 5C:
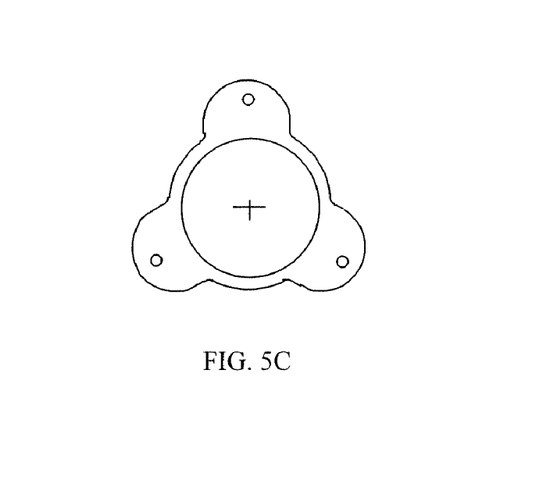
FIG. 5C is a side view of the push pin plate of the variable actuator of FIGS. 4A and 4B.

FIGS. 4A, 4B, and FIG. 5 show a further embodiment of a variable actuator 64 according to the present invention. This embodiment also shows a fixed pulley half 66 next to an engine, and the movable pulley half 68 outboard from the engine. In this embodiment, the movable pulley half is constrained to the fixed pulley half such that their relative motion is only along the axis 70 of the pulley halves. The linear bearing plate 72 is fixed, preferably by a press fit or threaded connection, to the fixed pulley half. Two or more linear bearings 74 are fixed to the linear bearing plate, and linear bearing pins 76 are constrained to move axially through each linear bearing. The linear bearing pins are fixed to the base plate 78, which is fixed to the movable pulley half. The base plate may have alternating bearing pins 76 and push pins 80 as shown in FIG. 4A. Two variator disks 82 and 84 are also used, one, 82, fixed to the engine shaft 86 as shown, and the second, 84, fixed to a ball screw thread 88 which is rotatably mounted on the engine shaft. The ball screw thread 88 is free to rotate relative to the fixed pulley half 66, but is constrained axially by contact at its ends with disk 82 and linear bearing 72. It should be understood that thrust bearings could be placed in these locations as part of this invention. The ball screw nut 90 is fixed to the three push pins 80, which are fixed to the movable pulley half by means of the base plate. A roller 92 is in friction contact with the two variator disks, and can actuate them as disclosed above in the first embodiment. The combined effect of these constraints is that the movable pulley half and the ball screw nut can only translate relative to the fixed pulley half. There can be no relative rotation between the movable pulley half and the ball screw nut. There can also be no relative rotation between the movable pulley half and the fixed pulley half because of the constraints discussed above.

The operation of this embodiment is as follows. When the roller 92 is substantially centered, as shown, the two variator disks 82 and 84 are urged to spin at the same speed, causing no relative rotation between the ball screw thread 88 and the ball screw nut 90. Because of the helix angle of the ball screw, there is therefore also no axial relative motion between the ball screw nut and the ball screw thread. Because of the constraints detailed above, this prevents relative axial movement between the pulley halves 66 and 68. Thus, when the roller is substantially centered, there is no relative rotation between the ball screw nut and ball screw thread, so there is no actuation of the CVT, and the pulley halves are not urged to separate or move together axially.

When the roller 92 is inclined or rotated about the roller actuation axis 94, it urges the two variator disks 82 and 84 to spin at different speeds, which causes the ball screw thread 88 to spin at a different speed from the ball screw nut 90 (which rotates at the same speed as the engine and the movable pulley half 68). Relative rotation of the ball screw nut and threads causes relative axial motion between the pulley halves 66 and 68, which actuates the CVT. Because the roller can be actuated in either direction from the centered position shown, the movable pulley half can be moved toward or away from the fixed pulley half. Regulation of the roller actuation angle, as by the above-referenced electric motor and control system, can control the relative axial position of the pulley halves, and thereby control the CVT ratio.

Advantages of this embodiment include:
(1) The power requirements for moving the pulley halves 66 and 68 apart and together come primarily from the engine shaft 86, through the variator disk 82. This greatly reduces the actuator power requirements for the system.
(2) The linear bearing coupling 74 between the pulley halves decouples the belt forces from the actuation of the pulley halves. Belt tension forces are transferred directly between the movable pulley half and the engine shaft through the base plate 78, the push pins 80, the linear bearings, and the linear bearing plate 72.
(3) Rolling elements are used to reduce friction at the key places in the CVT: in the ball screw, 88 and 90, and in the linear bearings.

It should be understood by one of ordinary skill in the art that the linear bearings 74, which contain rolling elements, could be replaced with bushings, and the ball screw, 88 and 90, could be replaced with a threaded joint containing no rolling elements. It should also be understood that an actuator of the type shown in FIGS. 2A and 2B could also be used to control the angular orientation of the roller in the embodiment shown in FIGS. 4A and 4B, and FIG. 5.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A continuously variable transmission (CVT), comprising:
    first and second variable-diameter pulleys mechanically linked by a flexible drive member, said pulleys each having an axis and first and second relatively axially movable pulley portions; and
    a roller variator having first and second disks mounted on the axis of said first pulley, a roller interconnecting said disks, said roller having a spin axis, and a roller support adapted to tilt the spin axis of said roller so as to change its points of contact with said disks and thereby change the speed ratio of said variator, said first and second disks connected respectively to said first and second relatively axially movable pulley portions of said first pulley wherein said change in speed ratio of said variator causes movement of at least one of said first and second relatively axially movable pulley portions.

2. The CVT of claim 1, wherein said first and second disks are rotatably fixed with respect to said first and second pulley portions, respectively.

3. The CVT of claim 2, further comprising a rotary-to-linear-translation device connecting said second pulley portion to said first pulley portion.

4. The CVT of claim 3, wherein said rotary-to-linear-translation device is a threaded connection.

5. The CVT of claim 4, wherein said rotary-to-linear-translation device is a ball screw.

6. The CVT of claim 1, wherein said first disk is rotatably fixed with respect to said first pulley portion and said second disk is rotatable with respect to said second pulley portion.

7. The CVT of claim 6, further comprising a rotary-to-linear-translation device connecting said second disk to said second pulley portion.

8. The CVT of claim 7, wherein said rotary-to-linear-translation device includes a threaded connection.

9. The CVT of claim 8, wherein said rotary-to-linear-translation device is a ball screw.

10. The CVT of claim 9, wherein said first and second disks are substantially fixed axially with respect to each other.

11. The CVT of claim 1, wherein said first and second disks are substantially fixed axially with respect to each other.

* * * * *